3,249,448
TRANSFER INK
Carroll Richard Coburn and Philip Mygatt, Cincinnati, Ohio, assignors to Interchemical Corporation, New York, N.Y., a corporation of Ohio
No Drawing. Filed Aug. 6, 1963, Ser. No. 300,187
4 Claims. (Cl. 106—31)

This invention relates to a transfer ink composition and more particularly to a transfer ink composition free from vegetable waxes.

Transfer inks known to the prior art, such as one-time carbon paper inks, utilize some proportion of relatively expensive waxes of vegetable or synthetic origin, such as carnauba, ouricury, etc., to assist in dispersion of the pigment. These waxes are also used as solubilizers for dyes such as methyl violet or nigrosine, the dyes actually functioning as dispersing agents to promote low viscosity in the composition as well as being coloring ingredients.

The novel transfer inks of this invention achieve dispersion by having the pigment ground up with a relatively low cost oxidized polyethylene wax of emulsifiable type, the wax being both a dispersing agent and a hardening agent for the finished ink.

*Example 1*

| Low molecular weight oxidized polyethylene wax ("Epolene LVE") | 10 |
|---|---|
| Carbon black beads | 15 |
| Paraffin of M.P. 141–145° F. | 45 |
| Ink oil (boiling range 314–342° F.) | 30 |
| | 100 |

The polyethylene wax is melted and the carbon black stirred in until wetted. The resulting mixture is then passed over a heated roll mill for a length of time sufficient to obtain the required fineness of grind. The paraffin is then melted, the oil added, and this combination is milled with the polyethylene-carbon black mixture until the batch is homogenous. The ink so obtained has a very low viscosity, exhibits good flow properties, and is relatively non-smudging.

*Example 2*

| Low molecular weight oxidized polyethylene wax ("Epolene LVE") | 3.0 |
|---|---|
| Paraffin wax (M.P. 133–135° F.) | 27.0 |
| Ink oil | 25.3 |
| Carbon black ("Molacco Black") | 20.0 |
| Kaolin ("hydrite clay") | 12.0 |
| Montan wax ("Alpco 16") | 12.0 |
| Methyl violet base | 0.2 |
| Nigrosine base | 0.5 |
| | 100.0 |

The first 5 ingredients were ground together to fineness 1.0 (mil) in a heated ball mill. The dyes were dissolved in the melted montan wax and then added and the grinding continued ½ hour more.

Besides the specific embodiments described in the examples, other proportions and ingredients may be used. The percent by weight of the oxidized polyethylene may range from 2–10; paraffin wax 10–45; ink oil 10–40; carbon black 10–30; clay 0–20; montan wax 0–25; methyl violet base 0–1.0; nigrosine base 0–1.0. Other colorants that may be used are iron blues, alkali blues, and other common pigments of various colors.

Without the oxidized polyethylene it is necessary to follow the practice of the prior art and incorporate a minimum of 5% of carnauba, ouricury, or special oxidized microcrystalline waxes to make workable carbon papers. The oxidized polyethylene also takes the place of relatively large quantities of montan wax, that is, in Example 2 for instance, if the amount of "Epolene LVE" is reduced to 1 or 2%, the amount of montan wax must be increased much more than 1 or 2%.

Carbon papers made with oxidized polyethylene wax compositions have more versatility than those of the prior art; there is a greater range of flexibility, workability in the coating operations, anti-smudging properties, etc. Besides the greater versatility of these coating compositions containing oxidized polyethylene, greater intensity of color and greater durability are obtained compared with the prior art systems for a given quantity of colorant. The novel compositions of this invention have also the advantage of being less costly than those now known to the art.

"Epolene LVE" is a low viscosity, emulsifiable oxidized polyethylene wax having a molecular weight of 1500, a hardness of 5 (100 gm., 5 seconds, 25° C. on the penetrometer), and a Brookfield viscosity of 400 centipoises at 120° C.

The ink oils used are commercial aliphatic hydrocarbon solvents having a boiling range from about 211–249° C. to about 314–342° C. and a kauri-butanol value of about 21–30.

What is claimed is:
1. A transfer ink composition consisting essentially of (1) about 2–10 percent by weight of an oxidized polyethylene wax having a molecular weight of about 1500, a Brookfield viscosity of about 400 centipoises at 120° C., and a penetrometer density of 5 at 25° C., (2) about 10–45 percent by weight of paraffin wax, (3) about 15–30 percent by weight of carbon black, and (4) about 10–40 percent by weight of an aliphatic hydrocarbon solvent having a boiling range in the region of about 211–342° C. and a kauri-butanol value of about 21–30.
2. A transfer ink composition as described in claim 1, with the further stipulation that up to about 55 percent by weight of the paraffin wax is replaced by montan wax.
3. A carbon paper made from the transfer ink composition described in claim 1.
4. A carbon paper made from the transfer ink composition described in claim 2.

References Cited by the Examiner

UNITED STATES PATENTS

| 2,471,102 | 5/1949 | Fish | 106—31 XR |
| 2,589,306 | 5/1952 | Steiner | 106—31 XR |
| 3,111,422 | 11/1963 | Newman | 106—31 XR |

OTHER REFERENCES

The Condensed Chemical Dictionary, Sixth Edition, Reinhold Publishing Corp., New York, 1951 (page 444, "Epolene," relied upon).

ALEXANDER H. BRODMERKEL, *Primary Examiner.*

J. B. EVANS, *Assistant Examiner.*